United States Patent
He

(10) Patent No.: US 11,872,535 B2
(45) Date of Patent: Jan. 16, 2024

(54) CONNECTING CHUCK OF MATERIAL CYLINDER FOR MIXER AND MIXER

(71) Applicant: Huanghua Promisee Dental Co., Ltd., Hebei (CN)

(72) Inventor: Qingxuan He, Hebei (CN)

(73) Assignee: HUANGHUA PROMISEE DENTAL CO., LTD., Huanghua (CN)

( * ) Notice: Subject to any disclaimer, the term of this patent is extended or adjusted under 35 U.S.C. 154(b) by 665 days.

(21) Appl. No.: 17/032,269

(22) Filed: Sep. 25, 2020

(65) Prior Publication Data

US 2021/0205773 A1 Jul. 8, 2021

(30) Foreign Application Priority Data

Jan. 3, 2020 (CN) .......................... 202010004794.4
Jan. 3, 2020 (CN) .......................... 202020012698.X

(51) Int. Cl.
*B01F 35/42* (2022.01)
*A61C 9/00* (2006.01)
*A61C 1/14* (2006.01)
*B01F 101/00* (2022.01)

(52) U.S. Cl.
CPC .............. *B01F 35/42* (2022.01); *A61C 1/144* (2013.01); *A61C 9/0026* (2013.01); *B01F 2101/2202* (2022.01)

(58) Field of Classification Search
CPC .......................... B01F 35/42; B01F 2101/2202
USPC ........................................................ 366/129
See application file for complete search history.

(56) References Cited

U.S. PATENT DOCUMENTS

| 5,918,772 A * | 7/1999 | Keller | B65D 81/325 |
| | | | 222/145.5 |
| 6,769,574 B1 * | 8/2004 | Keller | B05C 17/00509 |
| | | | 222/137 |
| 2010/0102088 A1 * | 4/2010 | Keller | B65D 81/325 |
| | | | 222/137 |
| 2010/0206905 A1 * | 8/2010 | Horner | A61C 5/62 |
| | | | 222/326 |

(Continued)

FOREIGN PATENT DOCUMENTS

| CN | 103976801 A | * | 8/2014 | |
| CN | 111097332 A | * | 5/2020 | ............. A61C 1/144 |

*Primary Examiner* — Marc C Howell
(74) *Attorney, Agent, or Firm* — Faegre Drinker Biddle & Reath LLP

(57) ABSTRACT

A connecting chuck of a material cylinder for a mixer and a mixer are disclosed according to the present application. The chuck includes a chuck body, and a first axial position-limiting connector and a second axial position-limiting connector are provided on the chuck body. After the chuck body rotates around the outlet pipe of the material cylinder by a preset angle, the first axial position-limiting connector can cooperate with a first axial position-limiting cooperating member on the material cylinder, and the second axial position-limiting connector can cooperate with a second axial position-limiting cooperating member on the mixer, so that an inlet pipe of the mixer is compressed with the outlet pipe of the material cylinder for cooperation. Through the above structure, after use, the chuck body reversely rotates to an initial position and the mixer is replaced, and the chuck body is reusable without replacement.

16 Claims, 3 Drawing Sheets

(56) References Cited

U.S. PATENT DOCUMENTS

| | | | |
|---|---|---|---|
| 2011/0151402 A1* | 6/2011 | An | B05C 17/00509 |
| | | | 433/82 |
| 2012/0199607 A1* | 8/2012 | Keller | B01F 25/43141 |
| | | | 222/137 |
| 2014/0117044 A1* | 5/2014 | Pappalardo | B05C 17/00553 |
| | | | 222/137 |
| 2017/0172348 A1* | 6/2017 | Vu | B01F 35/53 |
| 2017/0205009 A1* | 7/2017 | Pappalardo | B05C 17/00506 |

\* cited by examiner

CONNECTING CHUCK OF MATERIAL CYLINDER FOR MIXER AND MIXER

The application claims the priorities to Chinese patent application No. 202010004794.4 titled "CONNECTING CHUCK OF MATERIAL CYLINDER FOR MIXER AND MIXER", filed with the China National Intellectual Property Administration on Jan. 3, 2020, and Chinese patent application No. 202020012698.X, titled "CONNECTING CHUCK OF MATERIAL CYLINDER FOR MIXER AND MIXER", filed with the China National Intellectual Property Administration on Jan. 3, 2020, both of which are incorporated herein by reference in their entireties.

FIELD

The present application relates to the technical field of dental equipment, and in particular to a connecting chuck of a material cylinder for a mixer and a mixer.

BACKGROUND

Before making a dental denture, it is necessary to extract an image of a tooth position of a dental restorer and determine an occlusal relationship between upper and lower teeth. Generally, the impression is taken twice. An initial impression adopts a heavy body made of an elastic body impression material, and the impression material is mixed manually. The mixed material is put on an impression tray for the patient to occlude. A secondary impression adopts a light body made of an elastic body impression material, most of which are mixed and injected after the impression material mixer is connected with a two-component impression material cylinder. The patient performs twice occlusion, and an accurate tooth image is obtained finally.

In the conventional technology, the mixer is formed by a screw rod, an external pipe body and an engaging barrel. The screw rod is provided in the external pipe body, and the engaging barrel is rotatably connected with the external pipe body. After two inlets of the screw rod are connected with two outlets of the impression material cylinder, the engaging barrel rotates a quarter of circle to fix the screw rod and the impression material cylinder. A trigger of a silica gel conveyor is operated to apply a mechanical force, the matrix and catalyst in the impression material cylinder will be split and cross-mixed through two injection inlets of the screw rod, so that the two added agents are stirred rapidly and evenly, and after instant mixing, the agents are output through an outlet of the impression material mixer into an impression tray or around the teeth to be repaired, and then solidify.

The mixer is disposable, and the whole mixer needs to be replaced after use, which wastes materials and has high cost.

SUMMARY

In view of this, a first object of the present application is to provide a connecting chuck of a material cylinder for a mixer, so as to reduce the use cost of the mixer.

A second object of the present application is to provide a mixer based on the connecting chuck of the material cylinder for the mixer.

In order to achieve the above objects, the following technical solutions are provided according to the present application.

A connecting chuck of a material cylinder for a mixer is provided, which includes a chuck body sleeved outside an outlet pipe of the material cylinder. A first axial position-limiting connector and a second axial position-limiting connector are provided on the chuck body. After the chuck body rotates around the outlet pipe of the material cylinder by a preset angle, the first axial position-limiting connector can cooperate with a first axial position-limiting cooperating member on the material cylinder, and the second axial position-limiting connector can cooperate with a second axial position-limiting cooperating member on the mixer, to compress an inlet pipe of the mixer with the outlet pipe of the material cylinder for cooperation.

Preferably, one of the first axial position-limiting connector and the first axial position-limiting cooperating member includes multiple position-limiting steps uniformly spaced apart in the circumferential direction thereof, and the other one of the first axial position-limiting connector and the first axial position-limiting cooperating member includes multiple step cooperating grooves uniformly spaced apart in the circumferential direction thereof. After the chuck body rotates relative to the material cylinder by the preset angle, at least two of the multiple position-limiting steps are engaged with two of the multiple step cooperating grooves in one-to-one correspondence.

The second axial position-limiting connector includes multiple position-limiting engaging platforms uniformly distributed on an inner wall of the chuck body in a circumferential direction of the chuck body. The second axial position-limiting cooperating member includes multiple first position-limiting snaps provided on the mixer in the circumferential direction of the mixer. After the chuck body rotates relative to the mixer by the preset angle, the multiple position-limiting engaging platforms cooperate with the multiple first position-limiting snaps, to limit a position of the mixer in the axial direction.

Preferably, an anti-off tooth and an anti-off tooth groove cooperating with each other are respectively provided on at least one cooperating surface of the multiple position-limiting steps and the multiple step cooperating grooves.

Preferably, one of an upper surface of the multiple position-limiting steps and an inner top surface of the multiple step cooperating grooves is a bevel. And the bevel is used to cooperate with the other one of the upper surface of the multiple position-limiting steps and the inner top surface of the multiple step cooperating grooves when the multiple position-limiting steps rotate into the multiple step cooperating grooves, as to compress the chuck body downward.

Preferably, a position-limiting stop is provided at a rear end of each of the multiple position-limiting steps and/or a rear end of each of the multiple step cooperating grooves. The position-limiting stop is used to prevent the chuck body from continuing to rotate after the multiple position-limiting steps fully cooperate with the multiple step cooperating grooves.

Preferably, the position-limiting stop at the rear end of each of the multiple position-limiting steps extends in an axial direction of the chuck body to form a rotatable force applying structure.

Preferably, an anti-off position-limiting member is provided on the chuck body, which is used to cooperate with the anti-off cooperating member on the material cylinder when the first axial position-limiting connector disengages from the first axial position-limiting cooperating member, to prevent the chuck body from disengaging from the material cylinder.

Preferably, one of the anti-off position-limiting member and the anti-off cooperating member is a position-limiting annular plate, and the other one of the anti-off position-limiting member and the anti-off cooperating member is a position-limiting groove. The position-limiting annular plate cooperates with the position-limiting groove, to prevent the chuck body from disengaging from the material cylinder.

Preferably, the connecting chuck of the material cylinder for the mixer further includes a sealing piston. A third axial position-limiting cooperating member used for cooperating with the second axial position-limiting connector on the chuck body is provided on the sealing piston. The third axial position-limiting cooperating member includes multiple second position-limiting snaps on the sealing piston in the circumferential direction of the sealing piston. After the chuck body rotates relative to the sealing piston by the preset angle, the multiple position-limiting engaging platforms cooperate with the multiple second position-limiting snaps, to compress the sealing piston on the material cylinder and to block the outlet pipe of the material cylinder.

A mixer used for cooperating with the connecting chuck of the material cylinder for the mixer described in any one of the above is provided, which includes an outer pipe body, a connecting sleeve and a screw rod. An inlet pipe cooperating with the outlet pipe of the material cylinder by inserting is provided on a side of the connecting sleeve, and the other side of the connecting sleeve is connected to the screw rod. The screw rod is inserted into an inner cavity of the outer pipe body. The connecting sleeve is engaged with the outer pipe body, to make the connecting sleeve and the outer pipe body be relatively position-limited in the axial direction of the mixer and be rotatably connected with each other. The second axial position-limiting cooperating member, used for cooperating with the second axial position-limiting connector, of the mixer is arranged on the outer pipe body.

In order to achieve the above objects, the connecting chuck of the material cylinder for the mixer according to the present application includes the chuck body. The chuck body is used to be sleeved outside the outlet pipe of the material cylinder. The first axial position-limiting connector and the second axial position-limiting connector are arranged on the chuck body. After the chuck body rotates around the outlet pipe of the material cylinder by the preset angle, the first axial position-limiting connector may cooperate with the first axial position-limiting cooperating member on the material cylinder, and the second axial position-limiting connector may cooperate with the second axial position-limiting cooperating member on the mixer to compress the inlet pipe of the mixer with the outlet pipe of the material cylinder for cooperation. In application, the chuck body is sleeved outside the outlet pipe of the material cylinder, and then the mixer is inserted into the outlet pipe of the material cylinder, or, the mixer may be inserted into the outlet pipe of the material cylinder first, and then the chuck body is sleeved outside the outlet pipe of the material cylinder, and then the chuck body rotates to make the first axial position-limiting connector cooperate with the first axial position-limiting cooperating member, and the second axial position-limiting connector cooperate with the second axial position-limiting cooperating member, thereby achieving the mounting of the mixer. After use, the chuck body reversely rotates to an initial position and the mixer is replaced, and the chuck body is reusable without replacement, thereby saving the cost and reducing the use cost of the mixer.

A mixer used for cooperating with the connecting chuck of the material cylinder for the mixer described in any one of the above is further provided according to the present application, which includes the outer pipe body, the connecting sleeve and the screw rod. The inlet pipe cooperating with the outlet pipe of the material cylinder by inserting is provided on the side of the connecting sleeve, and the other side of the connecting sleeve is connected to the screw rod. The screw rod is inserted into the inner cavity of the outer pipe body. The connecting sleeve is engaged with the outer pipe body, so that the connecting sleeve and the outer pipe body are relatively position-limited in the axial direction and rotatably connected with each other. The second axial position-limiting cooperating member, used for cooperating with the second axial position-limiting connector, of the mixer is arranged on the outer pipe body. The mixer adopts a structure that the internal cooperates with the external, and the internal and external are rotatably connected with each other, thereby facilitating the cooperating connection between the chuck body and the material cylinder.

BRIEF DESCRIPTION OF THE DRAWINGS

In order to illustrate technical solutions according to the embodiments of the present application or in the conventional technology more clearly, the drawings to be used in the description of the conventional technology or the embodiments are described briefly hereinafter. Apparently, the drawings described hereinafter are only some embodiments of the present application, and other drawings may be obtained by those skilled in the art based on those drawings without any creative effort.

Figure 1:
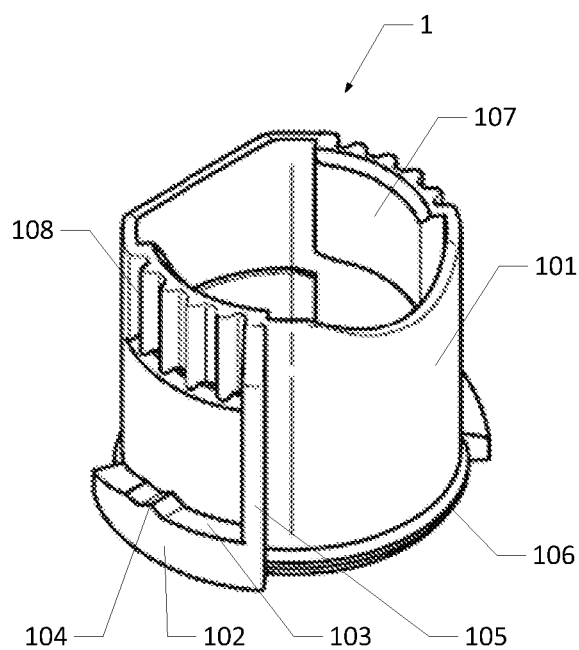
FIG. 1 is an axonometric view of a connecting chuck of a material cylinder for a mixer according to an embodiment of the present application.

| Reference numerals: | |
|---|---|
| 1 connecting chuck, | 101 chuck body, |
| 102 position-limiting step, | 103 bevel, |
| 104 anti-off tooth, | 105 position-limiting stop, |
| 106 position-limiting annular plate, | 107 position-limiting engaging platform, |
| 2 sealing piston, | 201 plug, |
| 202 handle, | 203 horizontal step surface, |
| 204 second position-limiting snap, | 3 mixer, |
| 301 outer pipe body, | 302 connecting sleeve, |
| 303 inlet pipe, | 304 first position-limiting snap, |
| 305 screw rod, | 306 annular boss, |
| 4 material cylinder, | 401 outlet pipe, |
| 402 step cooperating groove. | |

DETAILED DESCRIPTION OF THE EMBODIMENTS

A core of the present application is to provide a connecting chuck of a material cylinder for a mixer, so as to save the material and reduce the use cost of the mixer.

Another core of the present application is to provide a mixer according to the connecting chuck of the material cylinder for the mixer.

Technical solutions of embodiments of the present application are clearly and completely described hereinafter in conjunction with the drawings of the embodiments of the present application. Apparently, the embodiments described are only some embodiments of the present application, rather than all embodiments. Based on the embodiments of the present application, all of other embodiments, made by those skilled in the art without any creative efforts, fall into the scope of protection of the present application.

Figure 2:
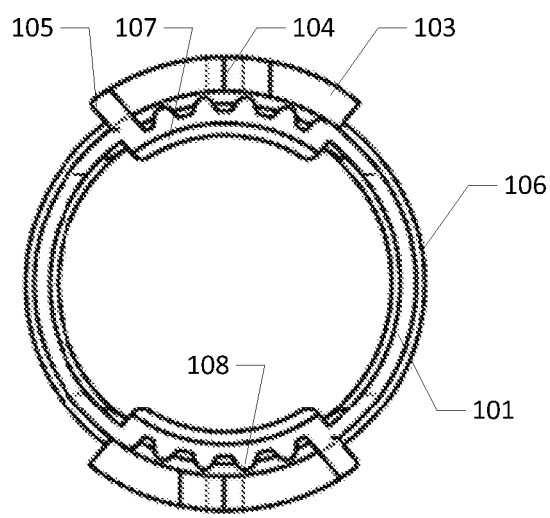
FIG. 2 is a top view of a connecting chuck of a material cylinder for a mixer according to the embodiment of the present application.
Figure 4:
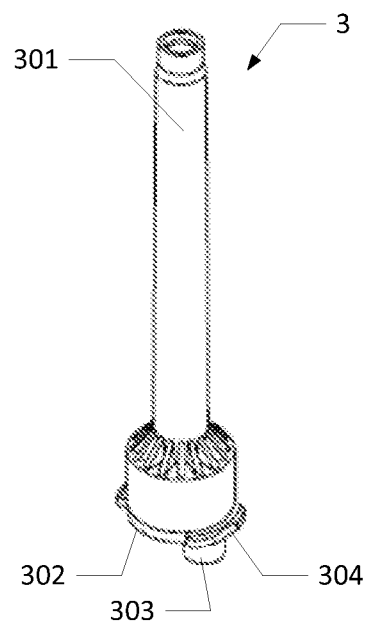
FIG. 4 is an axonometric view of a mixer according to an embodiment of the present application.
Figure 6:
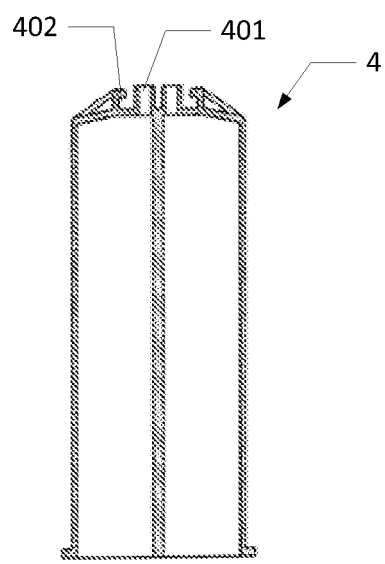
FIG. 6 is a sectional view of a material cylinder according to an embodiment of the present application.

Referring to FIGS. 1, 2, 4 and 6, FIG. 1 is an axonometric view of a connecting chuck of a material cylinder for a mixer according to an embodiment of the present application; FIG. 2 is a top view of a connecting chuck of a material cylinder for a mixer according to an embodiment of the present application; FIG. 4 is an axonometric view of a mixer according to an embodiment of the present application; and FIG. 6 is a sectional view of a material cylinder according to an embodiment of the present application.

A connecting chuck of a material cylinder 1 for a mixer is provided according to an embodiment of the present application, which is used to connect a material cylinder 4 with a mixer 3. The connecting chuck of the material cylinder 1 for the mixer includes a chuck body 101. The chuck body 101 is annular as a whole, so as to be sleeved outside an outlet pipe 401 of the material cylinder 4. A first axial position-limiting connector and a second axial position-limiting connector are provided on the chuck body 101, after the chuck body 101 rotates around the outlet pipe 401 of the material cylinder 4 by a preset angle, the first axial position-limiting connector may cooperate with a first axial position-limiting cooperating member on the material cylinder 4, and the second axial position-limiting connector may cooperate with a second axial position-limiting cooperating member on the mixer 3, so that an inlet pipe 303 of the mixer 3 is compressed with the outlet pipe 401 of the material cylinder 4 for cooperation. One of the first axial position-limiting connector and the first axial position-limiting cooperating member may be a protrusion-shaped structure, and the other one of the first axial position-limiting connector and the first axial position-limiting cooperating member may be a groove-shaped structure, and the first axial position-limiting connector and the first axial position-limiting cooperating member gradually cooperate with each other as the rotation of the chuck body 101. The second axial position-limiting connector and the second axial position-limiting cooperating member may adopt a protrusion-groove cooperating structure similar to that of the first axial position-limiting connector and the first axial position-limiting cooperating member.

In summary, compared with the conventional technology, when the connecting chuck of the material cylinder 1 for the mixer according to the present application is applied, the chuck body 101 is sleeved outside the outlet pipe 401 of the material cylinder 4, and then the mixer 3 is inserted into the outlet pipe 401 of the material cylinder 4, or, the mixer 3 may be inserted into the outlet pipe 401 of the material cylinder 4 first, and then the chuck body 101 is sleeved outside the outlet pipe 401 of the material cylinder 4, and then the chuck body 101 rotates to make the first axial position-limiting connector cooperate with the first axial position-limiting cooperating member, and the second axial position-limiting connector cooperates with the second axial position-limiting cooperating member, thereby achieving the mounting of the mixer 3. After use, the chuck body 101 reversely rotates to an initial position and the mixer 3 is replaced, and the chuck body 101 is reusable without replacement, thereby saving the cost and reducing the use cost of the mixer 3.

In an embodiment, one of the first axial position-limiting connector and the first axial position-limiting cooperating member includes multiple position-limiting steps 102 uniformly spaced apart in the circumferential direction thereof, and the other one of the first axial position-limiting connector and the first axial position-limiting cooperating member includes multiple step cooperating grooves 402 uniformly spaced apart in the circumferential direction thereof. After the chuck body 101 rotates relative to the material cylinder 4 by the preset angle, at least two of the multiple position-limiting steps 102 are engaged with two of the multiple step cooperating grooves 402 in one-to-one correspondence. Specifically, as shown in FIGS. 1 and 2, two position-limiting steps 102 are provided on an outer wall of the chuck body 101, and the two position-limiting steps 102 are symmetrical about a center of a middle axis of the chuck body 101. Correspondingly, the material cylinder 4 is provided with the step cooperating grooves 402. It should be noted that, the number of the position-limiting steps may be the same as the number of the step cooperating grooves 402, for example, two position-limiting steps and two step cooperating grooves 402 as shown in FIGS. 1 and 6. Moreover, the number of the position-limiting steps may also more than the number of the step cooperating grooves 402, that is, two or more even-numbered position-limiting steps and two step cooperating grooves 402 are adopted. Thus, each position-limiting step on the chuck body 101 may periodically cooperate with the step cooperating groove 402 on the material cylinder 4 as the rotation of the chuck body 101.

In an embodiment, as shown in FIGS. 1, 2 and 4, in an embodiment of the present application, the second axial position-limiting connector includes multiple position-limiting engaging platforms 107 uniformly distributed on an inner wall of the chuck body 101 in the circumferential direction of the chuck body 101, and the second axial position-limiting cooperating member includes multiple first position-limiting snaps 304 provided on the mixer 3 in the circumferential direction of the mixer 3. After the chuck body 101 rotates relative to the mixer 3 by the preset angle, the position-limiting engaging platforms 107 cooperate with the first position-limiting snaps 304, so as to limit a position of the mixer 3 in an axial direction.

Certainly, in another embodiment, the second axial position-limiting connector and the second axial position-limiting cooperating member may also adopt other cooperating method. One of the second axial position-limiting connector and the second axial position-limiting cooperating member may be an L-shaped groove, and the other one of the second axial position-limiting connector and the second axial position-limiting cooperating member may be an engaging protrusion. An opening for the engaging protrusion passing through is provided in a section of the L-shaped groove in the axial direction of the chuck body 101 or the mixer 3. Thus, during the assembly, the engaging protrusion may be aligned with the opening of the L-shaped groove first, and then the mixer 3 is compressed downward to an extreme position relative to the chuck body 101, and the chuck body 101 rotates again.

Alternatively, one of the second axial position-limiting connector and the second axial position-limiting cooperating member may be a boss, and a groove with openings at two ends are provided on the boss in the circumferential direction. An avoiding space is formed between two adjacent bosses. And the other one of the second axial position-limiting connector and the second axial position-limiting cooperating member may be a protrusion cooperating with the groove.

It should be noted that, the cooperating structure between the first axial position-limiting connector and the first axial position-limiting cooperating member and between the second axial position-limiting connector and the second axial position-limiting cooperating member is not limited to the above embodiments, which may be designed by those skilled in the art according to needs and not be limited herein.

In an embodiment, in order to avoid the position-limiting step 102 from disengaging from the step cooperating groove 402 during use, in an embodiment of the present application, as shown in FIGS. 1 and 2, an anti-off tooth 104 and an anti-off tooth 104 groove cooperating with each other are respectively provided on at least one cooperating surface of the position-limiting step 102 and the step cooperating groove 402. Thus, after the position-limiting step 102 fully cooperates with the step cooperating groove 402, the anti-off tooth 104 is engaged with the anti-off tooth 104 groove, so as to limit the positions of the position-limiting step 102 and the step cooperating groove 402, thereby preventing the disengagement of the position-limiting step 102 and the step cooperating groove 402. And when the position-limiting step 102 and the step cooperating groove 402 needs to be separated, the anti-off tooth 104 may be forced to disengage from the anti-off tooth 104 groove by applying a certain external force.

For further optimizing the above technical solutions, as shown in FIG. 1, one of an upper surface of the position-limiting step 102 and an inner top surface of the step cooperating groove 402 is a bevel 103. And the bevel 103 is used to cooperate with the other one of the upper surface of the position-limiting step 102 and the inner top surface of the step cooperating groove 402 when the position-limiting step 102 rotates into the step cooperating groove 402 to compress the chuck body 101 downward, so as to allow the chuck body 101 to have a downward tendency and to compress the mixer 3 on the outlet pipe 401 of the material cylinder 4.

In an embodiment, as shown in FIG. 1, a position-limiting stop 105 is provided at a rear end of the position-limiting step 102 and/or a rear end of the step cooperating groove 402. And the position-limiting stop 105 is used to prevent the chuck body 101 from continuing to rotate after the position-limiting step 102 fully cooperates with the step cooperating groove 402.

Further, the position-limiting stop 105 at the rear end of the position-limiting step 102 extends in the axial direction of the chuck body 101 to form a rotatable force applying structure, thereby facilitating the application of force when the user rotates the chuck body 101.

In an embodiment, an anti-off position-limiting member is provided on the chuck body 101, which is used to cooperate with the anti-off cooperating member on the material cylinder 4 when the first axial position-limiting connector disengages from the first axial position-limiting cooperating member, so as to prevent the chuck body 101 from disengaging from the material cylinder 4.

Further, one of the anti-off position-limiting member and the anti-off cooperating member is a position-limiting annular plate 106, and the other one of the anti-off position-limiting member and the anti-off cooperating member is a position-limiting groove. The position-limiting annular plate 106 cooperates with the position-limiting groove, so as to prevent the chuck body 101 from disengaging from the material cylinder 4. As shown in FIG. 1, the position-limiting annular plate 106 is arranged on the chuck body 101, and the position-limiting groove is arranged on the material cylinder 4. In the present solution, the position-limiting groove has the same structure as the step cooperating groove 402 served as the first axial position-limiting cooperating member.

In order to facilitate the user's operation, as shown in FIG. 1, anti-skid lines 108 are provided on an outer wall of the chuck body 101.

Figure 3:
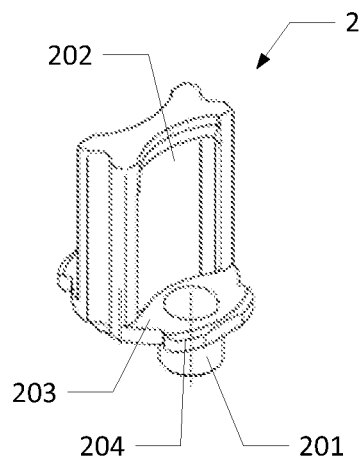
FIG. 3 is an axonometric view of a sealing piston cooperating with a connecting chuck of a material cylinder for a mixer according to the embodiment of the present application.

In an embodiment, the connecting chuck 1 of the material cylinder for the mixer further includes a sealing piston 2, as shown in FIG. 3. The sealing piston 2 is used to cooperate with the chuck body 101, so as to block the outlet pipe 401 of the material cylinder 4. A third axial position-limiting cooperating member used for cooperating with the second axial position-limiting connector on the chuck body 101 is provided on the sealing piston 2. The third axial position-limiting cooperating member includes multiple second position-limiting snaps 204 on the sealing piston 2 in the circumferential direction of the sealing piston 2. After the chuck body 101 rotates relative to the sealing piston 2 by the preset angle, the position-limiting engaging platforms 107 cooperate with the second position-limiting snaps 204, so as to compress the sealing piston 2 on the material cylinder 4 and to block the outlet pipe 401 of the material cylinder 4.

Specifically, a plug 201 is provided on the sealing piston 2, a diameter of the plug 201 is less than that of the outlet pipe 401 of the material cylinder 4, so as to insert into the outlet pipe 401 of the material cylinder 4, thereby blocking the outlet pipe 401 of the material cylinder 4.

A handle 202 is provided on a side of the sealing piston 2 away from the plug 201, and a groove is provided on each of four surfaces of the handle 202, so as to facilitate the holding by fingers.

A horizontal step surface 203 is provided on a side of the sealing piston 2 where the handle 202 is provided, and the horizontal step surface 203 facilitates applying downward pressure on the sealing piston 2.

Figure 5:
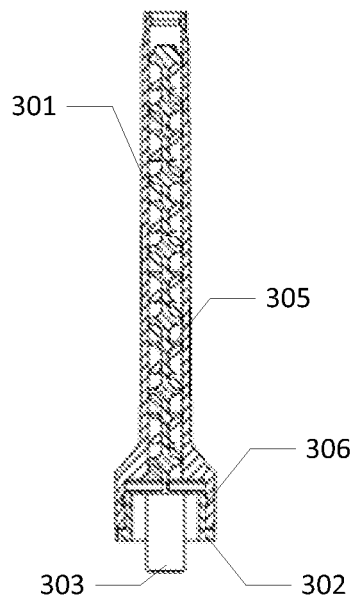
FIG. 5 is a sectional view of a mixer according to an embodiment of the present application.

Referring to FIGS. 4 and 5, a mixer 3 used for cooperating with the connecting chuck of the material cylinder 1 for the mixer described in any one of the above is provided according to an embodiment of the present application, which includes an outer pipe body 301, a connecting sleeve 302 and a screw rod 305. An inlet pipe 303 cooperating with the outlet pipe 401 of the material cylinder 4 by inserting is provided on a side of the connecting sleeve 302, the inlet pipe 303 is inserted into the outlet pipe 401 of the material cylinder 4, and the other side of the connecting sleeve 302 is connected to the screw rod 305. The screw rod 305 is inserted into an inner cavity of the outer pipe body 301. The connecting sleeve 302 is engaged with the outer pipe body 301, to make the connecting sleeve 302 and the outer pipe body 301 be relatively position-limited in the axial direction of the mixer and be rotatably connected with each other. The second axial position-limiting cooperating member, used for cooperating with the second axial position-limiting connector, of the mixer is arranged on the outer pipe body 301.

By arranging the mixer 3 that the internal is rotatable relative to the external, the mixer 3 may be mounted under the condition that the first axial position-limiting connector on the chuck body 101 does not disengage from the first axial position-limiting cooperating member on the material cylinder 4. The chuck body 101 may be assembled firmly with the material cylinder 4 first, and then the mixer 3 is assembled.

The engagement structure between the connecting sleeve 302 and the outer pipe body 301 includes an annular boss 306 provided on one of the cooperating surfaces of the connecting sleeve 302 and the outer pipe body 301, and an annular groove provided on the other one of the cooperating surfaces of the connecting sleeve 302 and the outer pipe body 301. The rotatable cooperation between the connecting sleeve 302 and the outer pipe body 301 is achieved by the cooperation between the annular boss 306 and the annular groove, and moreover, the connecting sleeve 302 and the outer pipe body 301 are axially limited in position.

Two inlet pipes 303 are provided on the connecting sleeve 302, and each outlet of the two inlet pipes 303 is in communication with a spiral conveying cavity formed between the screw rod 305 and the outlet pipe body 301, so that the two-component materials are split, cross-mixed and reversely swirl in the spiral conveying cavity, and the two-component materials are stirred rapidly and evenly, and are output through an outlet of an injector of impression material after instant mixing.

The above embodiments are described in a progressive manner. Each of the embodiments is mainly focused on describing its differences from other embodiments, and references may be made among these embodiments with respect to the same or similar parts.

The above illustration of the disclosed embodiments can enable those skilled in the art to practice or use the present application. Various modifications to the embodiments are apparent to the person skilled in the art, and the general principle herein can be implemented in other embodiments without departing from the spirit or scope of the present application. Therefore, the present disclosure is not limited to the embodiments described herein, but should be in accordance with the broadest scope consistent with the principle and novel features disclosed herein.

The invention claimed is:

1. A connecting chuck of a material cylinder for a mixer, comprising a chuck body sleeved outside an outlet pipe of the material cylinder, wherein, a first axial position-limiting connector and a second axial position-limiting connector are provided on the chuck body, after the chuck body rotates around the outlet pipe of the material cylinder by a preset angle, the first axial position-limiting connector is configured to cooperate with a first axial position-limiting cooperating member on the material cylinder, and the second axial position-limiting connector is configured to cooperate with a second axial position-limiting cooperating member on the mixer, to compress an inlet pipe of the mixer with the outlet pipe of the material cylinder for cooperation, wherein an anti-off position-limiting member is provided on the chuck body, which is configured to cooperate with an anti-off cooperating member on the material cylinder when the first axial position-limiting connector disengages from the first axial position-limiting cooperating member, to prevent the chuck body from disengaging from the material cylinder.

2. The connecting chuck of the material cylinder for the mixer according to claim 1, wherein, one of the first axial position-limiting connector and the first axial position-limiting cooperating member comprises a plurality of position-limiting steps uniformly spaced apart in a circumferential direction thereof, and another one of the first axial position-limiting connector and the first axial position-limiting cooperating member comprises a plurality of step cooperating grooves uniformly spaced apart in the circumferential direction thereof, after the chuck body rotates relative to the material cylinder by the preset angle, at least two of the plurality of position-limiting steps are engaged with two of the plurality of step cooperating grooves in one-to-one correspondence;

the second axial position-limiting connector comprises a plurality of position-limiting engaging platforms uniformly distributed on an inner wall of the chuck body in a circumferential direction of the chuck body, the second axial position-limiting cooperating member comprises a plurality of first position-limiting snaps provided on the mixer in a circumferential direction of the mixer, after the chuck body rotates relative to the mixer by the preset angle, the plurality of position-limiting engaging platforms cooperate with the plurality of first position-limiting snaps, to limit a position of the mixer in an axial direction of the mixer.

3. The connecting chuck of the material cylinder for the mixer according to claim 2, wherein, an anti-off tooth and an anti-off tooth groove cooperating with each other are respectively provided on at least one cooperating surface of the plurality of position-limiting steps and the plurality of step cooperating grooves.

4. The connecting chuck of the material cylinder for the mixer according to claim 2, wherein, one of an upper surface of the plurality of position-limiting steps and an inner top surface of the plurality of step cooperating grooves is a bevel, and the bevel is configured to cooperate with another one of the upper surface of the plurality of position-limiting steps and the inner top surface of the plurality of step cooperating grooves when the plurality of position-limiting steps rotate into the plurality of step cooperating grooves, to compress the chuck body downward.

5. The connecting chuck of the material cylinder for the mixer according to claim 3, wherein, one of an upper surface of the plurality of position-limiting steps and an inner top surface of the plurality of step cooperating grooves is a bevel, and the bevel is configured to cooperate with another one of the upper surface of the plurality of position-limiting steps and the inner top surface of the plurality of step cooperating grooves when the plurality of position-limiting steps rotate into the plurality of step cooperating grooves, to compress the chuck body downward.

6. The connecting chuck of the material cylinder for the mixer according to claim 2, wherein, a position-limiting stop is provided at a rear end of each of the plurality of position-limiting steps and/or a rear end of each of the plurality of step cooperating grooves, and the position-limiting stop is configured to prevent the chuck body from continuing to rotate after the plurality of position-limiting steps fully cooperate with the plurality of step cooperating grooves.

7. The connecting chuck of the material cylinder for the mixer according to claim 3, wherein, a position-limiting stop is provided at a rear end of each of the plurality of position-limiting steps and/or a rear end of each of the plurality of step cooperating grooves, and the position-limiting stop is configured to prevent the chuck body from continuing to rotate after the plurality of position-limiting steps fully cooperate with the plurality of step cooperating grooves.

8. The connecting chuck of the material cylinder for the mixer according to claim 6, wherein, the position-limiting stop at the rear end of each of the plurality of position-limiting steps extends in an axial direction of the chuck body to form a rotatable force applying structure.

9. The connecting chuck of the material cylinder for the mixer according to claim 1, wherein, one of the anti-off position-limiting member and the anti-off cooperating member is a position-limiting annular plate, and another one of the anti-off position-limiting member and the anti-off cooperating member is a position-limiting groove, and the position-limiting annular plate cooperates with the position-limiting groove, to prevent the chuck body from disengaging from the material cylinder.

10. The connecting chuck of the material cylinder for the mixer according to claim 2, further comprising a sealing piston, wherein, a third axial position-limiting cooperating member configured to cooperate with the second axial position-limiting connector on the chuck body is provided on the sealing piston, the third axial position-limiting cooperating member comprises a plurality of second position-limiting snaps on the sealing piston in the circumferential direction of the sealing piston, and after the chuck body rotates relative to the sealing piston by the preset angle, the plurality of position-limiting engaging platforms cooperate with the plurality of second position-limiting snaps, to compress the sealing piston on the material cylinder and to block the outlet pipe of the material cylinder.

11. The connecting chuck of the material cylinder for the mixer according to claim 3, further comprising a sealing piston, wherein, a third axial position-limiting cooperating member configured to cooperate with the second axial position-limiting connector on the chuck body is provided on the sealing piston, the third axial position-limiting cooperating member comprises a plurality of second position-limiting snaps on the sealing piston in the circumferential direction of the sealing piston, and after the chuck body rotates relative to the sealing piston by the preset angle, the plurality of position-limiting engaging platforms cooperate with the plurality of second position-limiting snaps, to compress the sealing piston on the material cylinder and to block the outlet pipe of the material cylinder.

12. The connecting chuck of the material cylinder for the mixer according to claim 8, further comprising a sealing piston, wherein, a third axial position-limiting cooperating member configured to cooperate with the second axial position-limiting connector on the chuck body is provided on the sealing piston, the third axial position-limiting cooperating member comprises a plurality of second position-limiting snaps on the sealing piston in the circumferential direction of the sealing piston, and after the chuck body rotates relative to the sealing piston by the preset angle, the plurality of position-limiting engaging platforms cooperate with the plurality of second position-limiting snaps, to compress the sealing piston on the material cylinder and to block the outlet pipe of the material cylinder.

13. A mixer configured to cooperate with the connecting chuck of the material cylinder for the mixer according to claim 1, comprising:
an outer pipe body;
a connecting sleeve; and
a screw rod, wherein, an inlet pipe cooperating with the outlet pipe of the material cylinder by inserting is provided on a side of the connecting sleeve, and another side of the connecting sleeve is connected to the screw rod, the screw rod is inserted into an inner cavity of the outer pipe body, the connecting sleeve is engaged with the outer pipe body to make the connecting sleeve and the outer pipe body be relatively position-limited in the axial direction of the mixer and be rotatably connected with each other, and the second axial position-limiting cooperating member, configured to cooperate with the second axial position-limiting connector, of the mixer is arranged on the outer pipe body.

14. A mixer configured to cooperate with the connecting chuck of the material cylinder for the mixer according to claim 2, comprising:
an outer pipe body;
a connecting sleeve; and
a screw rod, wherein, an inlet pipe cooperating with the outlet pipe of the material cylinder by inserting is provided on a side of the connecting sleeve, and another side of the connecting sleeve is connected to the screw rod, the screw rod is inserted into an inner cavity of the outer pipe body, the connecting sleeve is engaged with the outer pipe body to make the connecting sleeve and the outer pipe body be relatively position-limited in the axial direction of the mixer and be rotatably connected with each other, and the second axial position-limiting cooperating member, configured to cooperate with the second axial position-limiting connector, of the mixer is arranged on the outer pipe body.

15. A mixer configured to cooperate with the connecting chuck of the material cylinder for the mixer according to claim 3, comprising:
an outer pipe body;
a connecting sleeve; and
a screw rod, wherein, an inlet pipe cooperating with the outlet pipe of the material cylinder by inserting is provided on a side of the connecting sleeve, and another side of the connecting sleeve is connected to the screw rod, the screw rod is inserted into an inner cavity of the outer pipe body, the connecting sleeve is engaged with the outer pipe body to make the connecting sleeve and the outer pipe body be relatively position-limited in the axial direction of the mixer and be rotatably connected with each other, and the second axial position-limiting cooperating member, configured to cooperate with the second axial position-limiting connector, of the mixer is arranged on the outer pipe body.

16. A mixer configured to cooperate with the connecting chuck of the material cylinder for the mixer according to claim 4, comprising:
an outer pipe body;
a connecting sleeve; and
a screw rod, wherein, an inlet pipe cooperating with the outlet pipe of the material cylinder by inserting is provided on a side of the connecting sleeve, and another side of the connecting sleeve is connected to the screw rod, the screw rod is inserted into an inner cavity of the outer pipe body, the connecting sleeve is engaged with the outer pipe body to make the connecting sleeve and the outer pipe body be relatively position-limited in the axial direction of the mixer and be rotatably connected with each other, and the second axial position-limiting cooperating member, configured to cooperate with the second axial position-limiting connector, of the mixer is arranged on the outer pipe body.

* * * * *